June 30, 1942.  E. M. LAUDERDALE  2,288,004
TOOL HOLDER
Filed Oct. 21, 1940   2 Sheets-Sheet 1
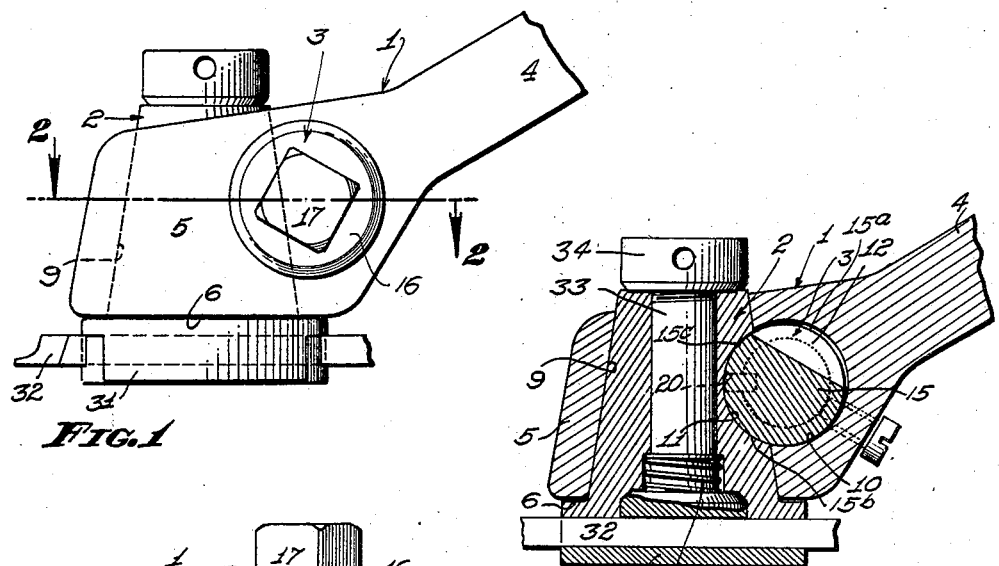
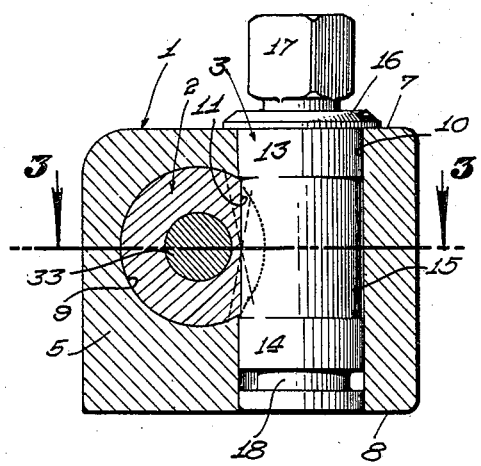
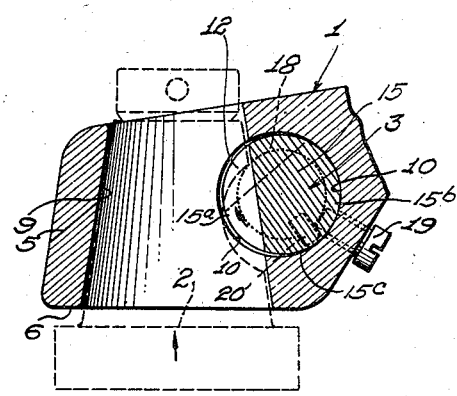
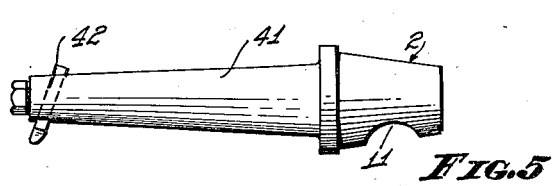
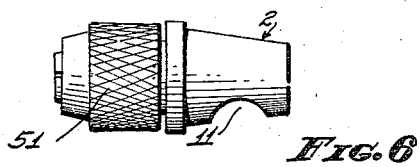
INVENTOR
EARL M. LAUDERDALE
BY
ATTORNEY June 30, 1942.  E. M. LAUDERDALE  2,288,004
TOOL HOLDER
Filed Oct. 21, 1940  2 Sheets-Sheet 2

INVENTOR
EARL M. LAUDERDALE
BY
ATTORNEY

Patented June 30, 1942

2,288,004

UNITED STATES PATENT OFFICE 2,288,004

TOOL HOLDER

Earl M. Lauderdale, Walnut Park, Calif.

Application October 21, 1940, Serial No. 362,101

13 Claims. (Cl. 82—37)

My invention relates to tool holders, more particularly to devices for holding the various cutting, shaping or boring tools used in conjunction with lathes or similar machines, and among the objects of my invention are:

First, to provide a tool holder which increases the work output of a conventional lathe, particularly when used for production machining in which a quantity of identical work pieces are turned out.

Second, to provide a tool holder which is adapted to hold interchangeably the various tools used to machine the work so that the operations may progress rapidly from one step to the next.

Third, to provide a tool holder in which the machining tool is automatically aligned in an exact predetermined relation with the holder so that the proper positioning of each tool is assured; thus, it is merely necessary for the machinist to note the lathe setting of a given tool in order to replace the tool in the correct position for a given operation on the work so that the same operation may be performed on a series of work pieces with assurance that the desired dimensions will be maintained.

Fourth, to provide a tool holder that is equally adapted to hold any of the different tools used in lathes such as conventional cutting or shaping tools, boring tools, drills or special machining tools or jigs used for special machining operations.

Fifth, to provide a tool holder which affords a particularly rigid mounting for the machining tool, to minimize any vibration or chatter caused by the tool holder or machining tool.

Sixth, to provide a tool holder which incorporates a novel locking means which not only secures the parts of the tool holder against both separation or rotation, but also draws the parts together tightly and rigidly, the locking means including a cam of slight eccentricity so that with only little effort a substantial force may be exerted to hold the parts together.

With the above and other objects in view as may appear hereinafter, reference is directed to the accompanying drawings in which:

Figure 1 is a top or plan view of my tool holder with the tool holder shank shown fragmentarily.

Figure 2 is a sectional view thereof taken through 2—2 of Fig. 1.

Figure 3 is another sectional view taken through 3—3 of Fig. 2.

Figure 4 is a sectional view of the tool holder shank with the tool holder mandrel removed, but showing by dotted lines an initial position of the mandrel from which it may be automatically drawn into the correct position.

Figure 5 is an elevational view on reduced scale of the tool holder mandrel incorporated with a boring bar.

Figure 6 is a similar elevational view showing the tool holder mandrel incorporated with a drill chuck.

Figure 7:
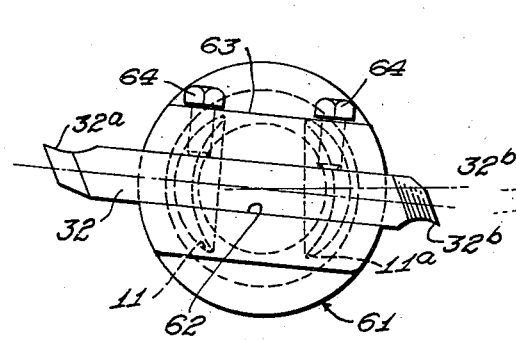
Figure 7 is an end elevational view of a modified form of tool holder mandrel which provides two positions of the cutting tool, the tool showing one position of the cutting tool.

The tool holder comprises generally, a tool holder shank 1, a tool holder mandrel 2 and a key post 3.

The tool holder shank is provided with a stem 4 of conventional form adapted to be secured in a conventional manner to the tool rest, not shown, of a lathe. At one end, the stem is provided with a head 5 which has a forward vertical side 6 disposed at an angle with respect to the axis of the stem and upper and lower sides 7 and 8 at right angles to the forward side.

A horizontal, tapered bore 9 extends through the head, its larger end intersecting the forward side 6. A cross bore 10 extends vertically from the upper to the lower sides of the head. The axis of the cross bore is offset laterally from the axis of the tapered bore, but their peripheries intersect.

The tapered bore 9 receives the tool holder mandrel 2 which is correspondingly tapered, while the cross bore 10 receives the key post 3. The mandrel 2 is provided with a keyway 11 which is complementary to the cross bore 10, while the key post is provided with a notch 12 which is complementary to the tapered bore. Thus, when the notch 12 is in registry with the tapered bore 9, the mandrel may be inserted or removed; and, when the keyway 11 is in registry the key post may be rotated.

The key post is provided at its upper and lower ends with bearing portions 13 and 14. At its midportion, embracing the notch 12, the key post is provided with an eccentric cam portion 15. The eccentric cam portion has a radius slightly smaller than the radius of the bearing portions and its axis is offset approximately diametrically opposite from the notch 12 so that the "low" side 15a of the cam is provided with the notch. The "high" side 15b of the cam is preferably tangential to the periphery of the bearing portions 13 and 14.

The keyway 11 is slightly eccentric with respect to the axis of the cross bore and its center of curvature is located forwardly of the axis of the cross bore. The radius of curvature of the keyway is equal to the radius of the cam portion and the axes of the keyway and cam portion substantially coincide when the "ascending" side 15c of the cam portion is rearward or toward the small end of the tapered bore.

To assemble the mandrel and tool holder shank, it is merely necessary to place the mandrel approximately in position; that is, the mandrel may be outwardly from its proper position as shown by dotted lines in Fig. 4, or turned from its proper position as shown by dotted lines in Fig. 2. The key post, as it turns from the position shown in Fig. 4 to that shown in Fig. 3, automatically aligns the mandrel. Once in position, the cam portion and rear wall of the keyway coact to draw the mandrel tightly in place against both axial movement and rotation. The keyway and cam portion need have only superficial eccentricity and consequently only a nominal torque need be applied to the key post to exert a strong holding force. Also, by placing the cam portion and notch of key post in the relative positions shown, the most effective section of the key post is placed in shear when the mandrel is tightened in place.

The key post is provided with a flange 16 and a wrench receiving means 17 at its upper end. Near its lower end the key post is provided with an annular groove 18 which is adapted to receive a set screw 19 secured in the head 5. A stop pin 20 is inserted in the groove 18 to limit rotation of the key post.

The tool holder shank is secured semi-permanently to the tool rest of the lathe; that is, the shank remains secured to the tool rest while different mandrels each having incorporated therewith specific machining tools such as cutting bars, boring bars, drill holding chucks are inserted to accomplish the various operations required to machine a given piece of work. Once the various tools have been adjusted and the lathe settings noted it is merely necessary to interchange them. Inasmuch as this can be done quickly the advantages of a "turret" lathe are given to an ordinary lathe.

It is contemplated that each of the specific tools used to perform a machine operation on a given piece of work has its individual integral mandrel 2. Thus, as shown in Figs. 1 through 4, the mandrel is provided with a clamp element 31 which coacts with the forward face of the mandrel to hold a cutting tool 32. The clamp element is provided with a stem 33 which extends through a bore provided in the mandrel and receives a nut 34 for the purpose of tightening the clamp element against the mandrel. The mandrel bore may be counterbored at its forward end to receive a spring 35 which assists in releasing the clamp element when the nut is loosened.

As shown in Fig. 5, the mandrel 2 may be provided with a boring bar 41 which extends coaxially therefrom and is provided at the end with a suitable tool holding means 42. Similarly, as shown in Fig. 6 a conventional drill chuck 51 may be provided with a mandrel 2.

Figure 8:
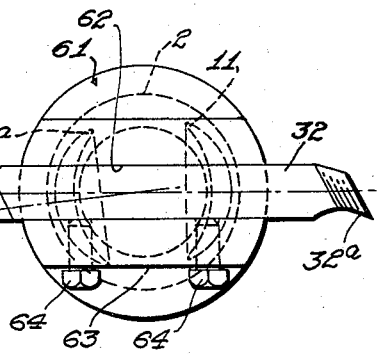
Figure 8 is a similar end elevational view thereof showing the other position of the cutting tool.
Figure 8A:
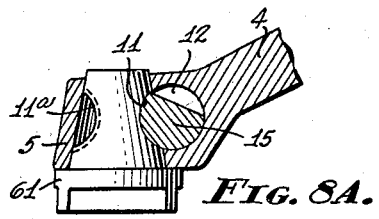
Figure 8A is a plan view on a reduced scale of the structure shown in Figs. 7 and 8 with the tool holder shank and key post in section.

Reference is now directed to Figures 7 and 8. The construction here shown is a modified form of the tool holder mandrel in which two positions are provided for the cutting tool. While the double position mandrel may be formed by merely providing an added keyway, the mandrel diametrically opposite the keyway 11, it is preferred to offset the added keyway 11a a few degrees from a one-hundred and eighty degree relation with the keyway 11. This permits the cutting tool 32 having two cutting ends 32a and 32b to have an upwardly inclined position as shown in Fig. 7 or a horizontal position as shown in Fig. 8.

While the head of the mandrel may be identical to that shown in Figs. 1 and 3, a modified head 61 is illustrated. The head 61 is provided with a diametrically extending channel 62 which receives the cutting tool 32 and is relieved on one or both sides of the channel to form shoulders 63 through which set-screws 64 extend to secure the cutting tool.

Figure 9:
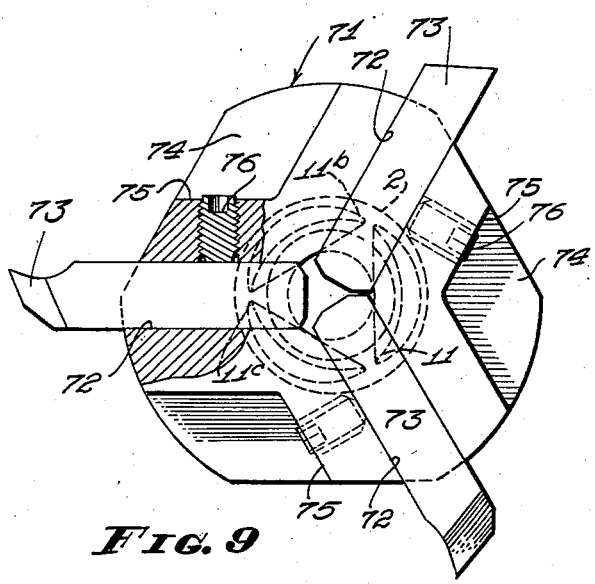
Figure 9 is an end elevational view with a portion thereof in section of a further modified form of tool holder mandrel which provides three positions for the cutting tool.
Figure 10:
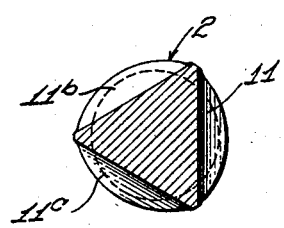
Figure 10 is a sectional view thereof taken through the plane of the keyways.
Figure 9A:
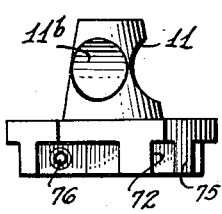
Figure 9A is a plan view on a reduced scale of the structure shown in Fig. 9.

With reference to Figs. 9 and 10, a further modified head 71 is shown which is provided with three radiating channels 72 receiving cutting tools 73 which in this case are single ended. The head is relieved as indicated by 74 to provide shoulders 75 which receive set-screws 76 adapted to secure their respective cutting tools 73. As in the previously described structure additional keyways 11b and 11c are provided. The three channels 72 and their corresponding keyways may be equally spaced or so positioned that some of the tools project horizontally and others are inclined when in operating position in the manner illustrated in Figs. 7 and 8.

While the holder herein described is primarily intended for use with lathes it should be noted that it may be used with other types of machine tools.

Though I have shown and described a particular embodiment of my invention, I do not wish to be limited thereto, but desire to include in the scope of my invention the constructions, combinations, and arrangements embraced in the appended claims.

I claim:

1. A machining tool holder comprising: a mounting member having a tapered socket therein, and a key bore disposed in laterally offset but intersecting relation therewith; a correspondingly tapered mandrel adapted to fit said socket and carrying a machining tool element; and a key post fitting said bore; said key post having a notch complementary to said tapered socket and said mandrel having a keyway complementary to said key bore.

2. A machining tool holder comprising: a mounting member adapted to be secured in the tool mounting means of a lathe; and including a head having a tapered bore and a laterally offset rightangularly disposed and intersecting cross bore; a tool carrying mandrel adapted to fit into said tapered bore and having a keyway adapted to register with said cross bore; and a key post fitting said cross bore and including cam means coacting with said keyway to draw the mandrel tightly into said tapered bore.

3. A machining tool holder comprising: a mounting member adapted to be secured in the tool mounting means of a lathe; and including a head having a tapered bore and a laterally offset rightangularly disposed and intersecting cross bore; a tool carrying mandrel adapted to fit into said tapered bore; and having a keyway adapted to register with said cross bore, and a key post fitting said cross bore and having a recess complementary to said tapered bore to permit insertion of said mandrel, and including a cam means adapted to engage said mandrel through said keyway to draw said mandrel tightly into said tapered bore.

4. A machining tool holder comprising: a mounting member adapted to be secured in the tool mounting means of a lathe; and including a head having a tapered bore and a laterally offset rightangularly disposed and intersecting cross bore; a tool carrying mandrel adapted to fit into said tapered bore, and having a keyway substantially complementary to said cross bore but disposed in superficial eccentricity to said cross bore when said mandrel is in position; and a key post fitting said cross bore and including an eccentric cam portion adapted to coact with said keyway to urge said mandrel tightly into said tapered bore.

5. A machining tool holder comprising: a mounting member adapted to be secured in the tool mounting means of a lathe and including a head having a tapered bore and a laterally offset rightangularly disposed and intersecting cross bore; a tool carrying mandrel adapted to fit into said tapered bore, and having a keyway substantially complementary to said cross bore but disposed in superficial eccentricity to said cross bore when said mandrel is in position; and a key post having upper and lower journal portions fitting said bore and an intermediate cam portion of superficial eccentricity adapted to coact with said keyway to urge said mandrel tightly into said tapered bore.

6. A construction as set forth in claim 4 wherein said key post is provided with a recess in its side wall which is complementary to said tapered bore, whereby said mandrel may be inserted and removed by turning said recess into registry with said tapered bore.

7. A construction as set forth in claim 5 wherein said key post is provided with a recess in its side wall which is complementary to said tapered bore, whereby said mandrel may be inserted and removed by turning said recess into registry with said tapered bore.

8. A machining tool holder comprising: a mounting member including a head portion having intersecting but offset tapered bore and cross bore; a mandrel for said tapered bore; a key post for said cross bore; said key post and mandrel having respectively a recess and a keyway complementary to the other bore; and means incorporated with said key post in the zone of its recess and, when said recess is out of registry with said tapered bore, engageable with said mandrel through said keyway to urge said mandrel tightly into said bore.

9. A machining tool holder comprising: a mounting member including a head portion having intersecting but offset tapered bore and cross bore; a mandrel for said tapered bore; a key post for said cross bore; said mandrel having a keyway complementary to said cross bore; said key post having a recess complementary to said tapered bore, and cam means incorporated in said key post and having an operating face in the zone of said recess but arcuately disposed therefrom whereby, upon rotation of said key post, said cam means engages said mandrel through said keyway to urge said mandrel tightly into said tapered bore.

10. A construction as set forth in claim 5 wherein said key post is provided with a recess complementary to said tapered bore in the zone of said cam portion whereby, when said recess is in registry with said tapered bore, said mandrel may be removed, said recess being located at the minor point of said cam portion whereby said recess is clear of said tapered bore when said cam portion is securing said mandrel.

11. A construction as set forth in claim 1 wherein the mandrel is provided with a plurality of keyways each complementary to said cross bore whereby said mandrel may be adjusted in a plurality of positions.

12. A machining tool holder comprising: a mounting member including a head portion having intersecting but offset tapered bore and cross bore; a mandrel for said tapered bore including a pair of keyways offset from diametrically opposed positions, and means securing a pair of cutting elements corresponding to said keyways and disposed in diametrically opposed relation; a key post for said cross bore, said key post having a recess complementary to said tapered bore; and cam means incorporated in said key post and having an operating face in the zone of said recess and engageable with the keyway of said mandrel in registry with said cross bore for urging said mandrel tightly into said tapered bore, said keyways being so related to their respective cutting elements that when coacting with said cam means one key way positions its cutting element horizontally and the other its cutting element on an incline.

13. A machining tool holder comprising: a mounting member adapted to be secured in the tool mounting means of a lathe and including a head having a tapered bore and a laterally offset right angularly disposed and intersecting cross bore; a tool carrying mandrel adapted to fit into said tapered bore, and having a keyway substantially complementary to said cross bore when said mandrel is in position; and a key post having upper and lower journal portions fitting said bore and an intermediate cam portion of superficial eccentricity adapted to coact with said keyway to urge said mandrel tightly into said tapered bore, said key post also provided with a recess complementary to said tapered bore in the zone of said cam portion whereby, when said recess is in registry with said tapered bore, said mandrel may be removed, said recess being located at the minor point of said cam portion whereby said recess is clear of said tapered bore when said cam portion is securing said mandrel in said tapered bore; said mandrel having a plurality of keyways adapted to coact interchangeably with said key post; and a plurality of cutting means held by said mandrel and corresponding to said keyways.

EARL M. LAUDERDALE.